(12) United States Patent
Weissler et al.

(10) Patent No.: US 12,004,260 B2
(45) Date of Patent: Jun. 4, 2024

(54) LOCAL SOFTWARE BEACON FOR DEVICE MANAGEMENT

(71) Applicant: DRIVING MANAGEMENT SYSTEMS, INC., Colorado Springs, CO (US)

(72) Inventors: Paul N. Weissler, Colorado Springs, CO (US); Robert M. Azzi, Colorado Springs, CO (US); Kyle Johnson, Colorado Springs, CO (US); Laura P. T. Johnston, Colorado Springs, CO (US)

(73) Assignee: DRIVING MANAGEMENT SYSTEMS, INC., Colorado Springs, CO (US)

( * ) Notice: Subject to any disclaimer, the term of this patent is extended or adjusted under 35 U.S.C. 154(b) by 0 days.

(21) Appl. No.: 17/665,900

(22) Filed: Feb. 7, 2022

(65) Prior Publication Data

US 2023/0254683 A1 Aug. 10, 2023

(51) Int. Cl.
*H04W 8/22* (2009.01)
*H04W 4/48* (2018.01)
*H04W 4/80* (2018.01)

(52) U.S. Cl.
CPC ............ *H04W 8/22* (2013.01); *H04W 4/48* (2018.02); *H04W 4/80* (2018.02)

(58) Field of Classification Search
None
See application file for complete search history.

(56) References Cited

U.S. PATENT DOCUMENTS

2018/0370360 A1* 12/2018 Hannon .................. H04W 4/00
2019/0182749 A1* 6/2019 Breaux ................ H04W 4/027

* cited by examiner

*Primary Examiner* — Frantz Bataille
(74) *Attorney, Agent, or Firm* — WARNER NORCROSS + JUDD LLP

(57) ABSTRACT

A method for managing user interactions with multiple mobile devices is provided. The method includes receiving, at one of the mobile devices, a user input to associate the mobile device with the on-duty vehicle driver, such that all remaining mobile devices within range of an in-vehicle network beacon are passenger mobile devices. The method then includes transmitting, by the driver mobile device, one or more signals to the passenger mobile devices, the one or more signals including a unique identifier and indicating the association of the driver mobile device with the on-duty driver. In response to the one or more signals from the driver mobile device, the passenger mobile devices enforce a different device usage policy (or suspend enforcement of a device usage policy) while a device usage policy on the driver mobile device is enforced to restrict access to functionality on only that device.

19 Claims, 6 Drawing Sheets

LOCAL SOFTWARE BEACON FOR DEVICE MANAGEMENT

FIELD OF THE INVENTION

The present invention relates to a method for managing interactions with mobile devices for preventing distracted driving and for other purposes.

BACKGROUND OF THE INVENTION

Distracted driving includes any activity that diverts attention from the primary task of driving. As mobile devices have become ubiquitous in modern society, efforts to mitigate distractions caused by mobile devices have gained increased emphasis. For example, social media applications, group chats, texting, and internet browsing can divert attention from the road and add to a driver's cognitive workload. Particularly among commercial vehicle fleets, it is preferable to disable some or all of these mobile device applications while simultaneously permitting calls and navigation functions.

Current mobile device management approaches including restricting mobile device features using policy-based controls. For example, WO2021/126846 to Weissler et al discloses the use of temporary device usage policies to remove non-whitelisted applications from a mobile device while within a moving vehicle. The non-whitelisted applications can include texting functions, social media applications, and internet browsers. The temporary device usage policies can be pushed by a remote server when a preselected criteria is met, for example the presence or absence of motion, a minimum speed, location, date and time, proximity to a signal source, and/or Bluetooth connectivity.

Although policy-based controls are effective in preventing individuals from accessing restricted functions, in some environments greater flexibility is desired. In team driving scenarios, for example, it can be desirable to restrict mobile device functionality for the on-duty driver while permitting this functionality for the off-duty driver, for example while in the passenger seat or the sleeper berth of a commercial vehicle. Further, the enforcement of policy controls can require an internet connection to a remote server, which may not be possible in all driving conditions and/or in all geographic locations.

Accordingly, there remains a continued need for an improved method for managing interactions with mobile devices where multiple mobile devices are present in a vehicle, for example a commercial vehicle in a team driving scenario, to limit distractions to the on-duty driver and for other applications.

SUMMARY OF THE INVENTION

Embodiments herein disclose a method for managing user interactions with mobile devices where multiple mobile devices are present. The method generally includes receiving, at one of the mobile devices, a user input to associate the mobile device with the on-duty vehicle driver, such that all remaining mobile devices within range of an in-vehicle network beacon are passenger mobile devices. The method then includes transmitting, by the driver mobile device, one or more signals to the passenger mobile devices, the one or more signals including a unique identifier and indicating the association of the driver mobile device with the on-duty driver. In response to the one or more signals from the driver mobile device, the passenger mobile devices enforce a different device usage policy (or suspend enforcement of a device usage policy) while a device usage policy on the driver mobile device is enforced to restrict access to functionality on only that device.

In some embodiments, the mobile devices are connected to each other and to an in-vehicle network beacon via a short range wireless network, for example Bluetooth, ZigBee, WiFi, or Near Field Communication (NFC). The mobile devices can receive the device usage policies from a remote server, and/or the device usage policies can be locally accessible to each of the mobile devices. The mobile devices are equipped to receive and transmit over the short range wireless network, with each transmission including a unique identifier. In embodiments where the short range wireless network includes Bluetooth, the unique identifier is included within the major and minor data fields that constitute part of the Bluetooth beacon signal. In other embodiments, the unique identifier includes a Media Access Control (MAC) address (for WiFi, ZigBee, and NFC) or an International Mobile Subscription Identity (IMSI) number, by non-limiting example.

In these and other embodiments, the driver mobile device enforces a device usage policy when a predetermined criteria is met. The predetermined criteria can include one or more of the following: movement of the mobile device above a threshold speed, motion of the mobile device, or the geographic location of the mobile device. The passenger mobile devices enforce a different device usage policy, or suspend enforcement of a device usage policy, while remaining connected to the driver mobile device over the short range wireless network. In this way, users of the passenger mobile devices (e.g., off-duty team drivers) can access functionality that would otherwise be prevented by the device usage policy being enforced on the mobile device associated with the on-duty team driver. When the drive is completed, all mobile devices disconnect from the in-vehicle network beacon. At this point, all mobile devices are reset until they return to the vehicle or another vehicle in the commercial fleet. The foregoing process begins again at the start of a new drive, since any of the prior passengers can be the on-duty driver.

In these and other embodiments, the present invention harnesses the functionality of Bluetooth hardware (or other communication hardware) already present on most mobile devices. The present invention includes a smartphone application that can receive a user designation of the host mobile device as the driver mobile device or as a passenger device, the smartphone application being further operable to implement a network connection with local devices (e.g., devices within 15 feet). Further, the selective enforcement of device usage policies can depend solely on the connection to the driver mobile device and/or an in-vehicle beacon, thereby changing policies without a connection to a remote server. For example, if a connection with the remote server is lost, the passenger mobile devices can manage the enforcement of their respective device usage policies based on their continued proximity to the in-vehicle network beacon and the designated driver device. Though described herein as relating to team driving scenarios, the present invention is not limited to team driving scenarios and can be used in other environments as desired.

These and other features of the invention will be more fully understood and appreciated by reference to the description of the embodiments and the drawings.

DETAILED DESCRIPTION OF THE CURRENT EMBODIMENT

As discussed herein, the current embodiment relates to a method for managing user interactions with mobile devices where multiple mobile devices are present. The method generally includes enforcing a device usage policy on a first mobile device associated with an on-duty driver and enforcing a different device usage policy (or suspending enforcement of a device usage policy) on the remaining mobile devices, where the mobile devices are connected to each other over a short range wireless network. Though described below as relating to team driving scenarios, the present invention is not limited to team driving scenarios and can be used in other environments as desired.

Figure 1:
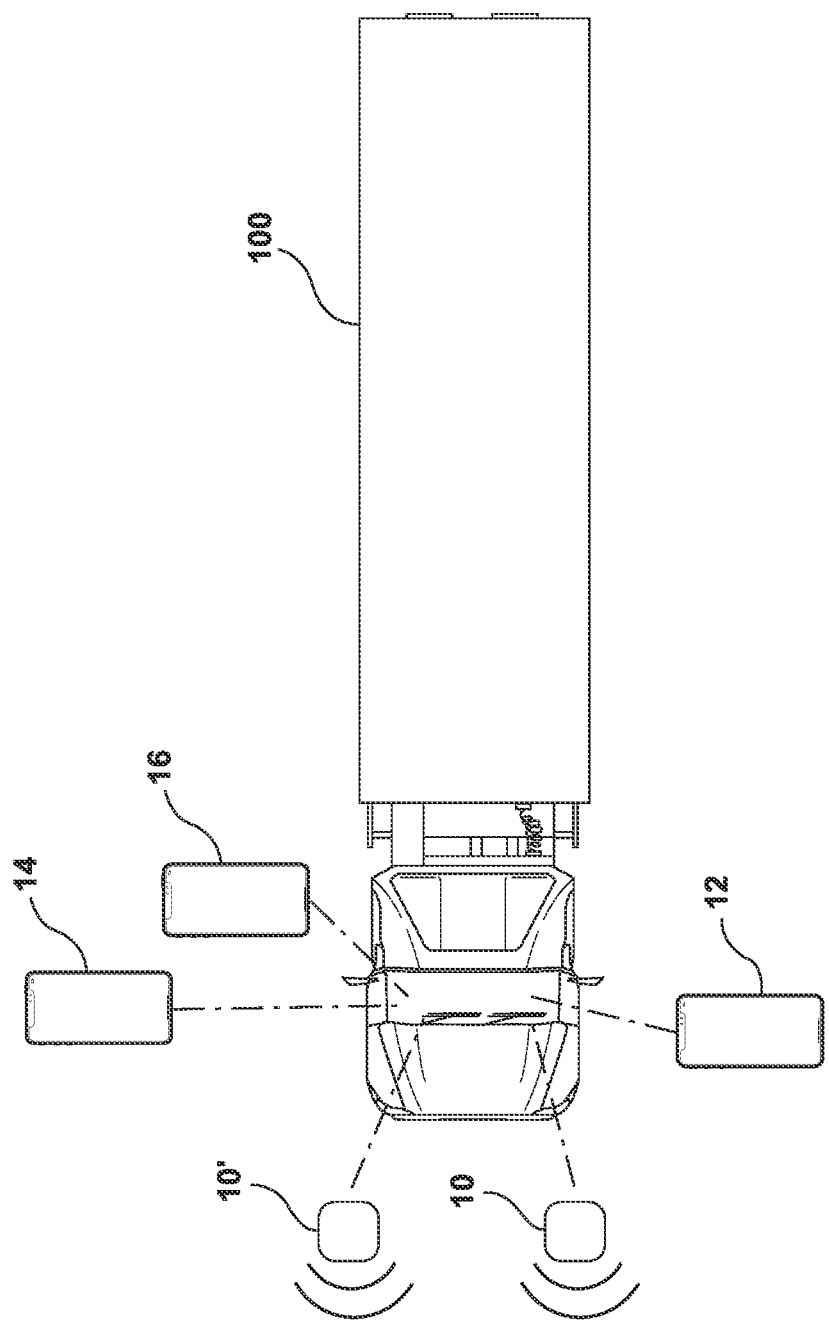
FIG. 1 is a system diagram of a semi-tractor including multiple mobile devices and an in-vehicle network beacon in accordance with one embodiment.
Figure 2:
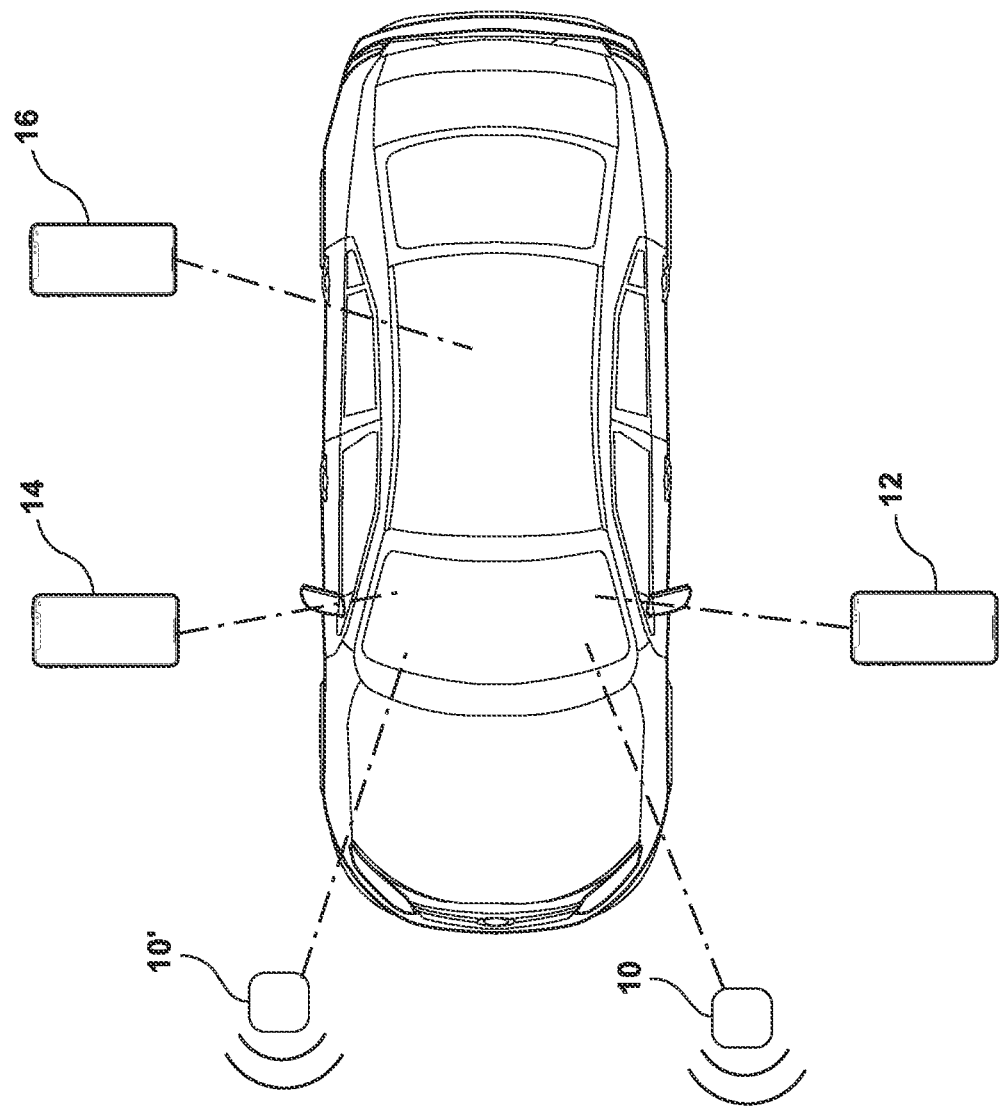
FIG. 2 is a system diagram of a passenger vehicle including multiple mobile devices and an in-vehicle network beacon in accordance with one embodiment.

Before the method is discussed in detail, a system architecture for implementation of the method is provided. As shown in FIGS. 1 and 2, the system architecture includes one or more network beacons 10, 10' located within the driver space of a vehicle 100 for wireless communication with two or more mobile devices 12, 14, 16. While two network beacons 10, 10' are illustrated, in other embodiments only a single beacon is used. The vehicle 100 is illustrated as a semi-tractor in FIG. 1 and a passenger car in FIG. 2, but can include other vehicles in other embodiments. The one or more network beacons 10, 10' are adapted to broadcast one or more RF signals to multiple mobile devices 12, 14, 16 within the vehicle 100. For example, a Bluetooth Low Energy (BLE) network beacon can broadcast short-range data packets at regular intervals, however other network beacons can be used in other embodiments. Each data packet can contain a unique identifier (UID) associated with the network beacon. Where two or more beacons are used, the received signal strength indicator (RSSI) can be used by each mobile device 12, 14, 16 to determine its relative location within the vehicle interior. For example, the network beacon 10, 10' generating the highest RSSI can represent the network beacon closest to the respective mobile device 12, 14, 16, which can be used to determine the relative location of each mobile device 12, 14, 16 within the vehicle 100, optionally in combination with the method of the present invention to verify the identity of the driver's mobile device.

Figure 3:
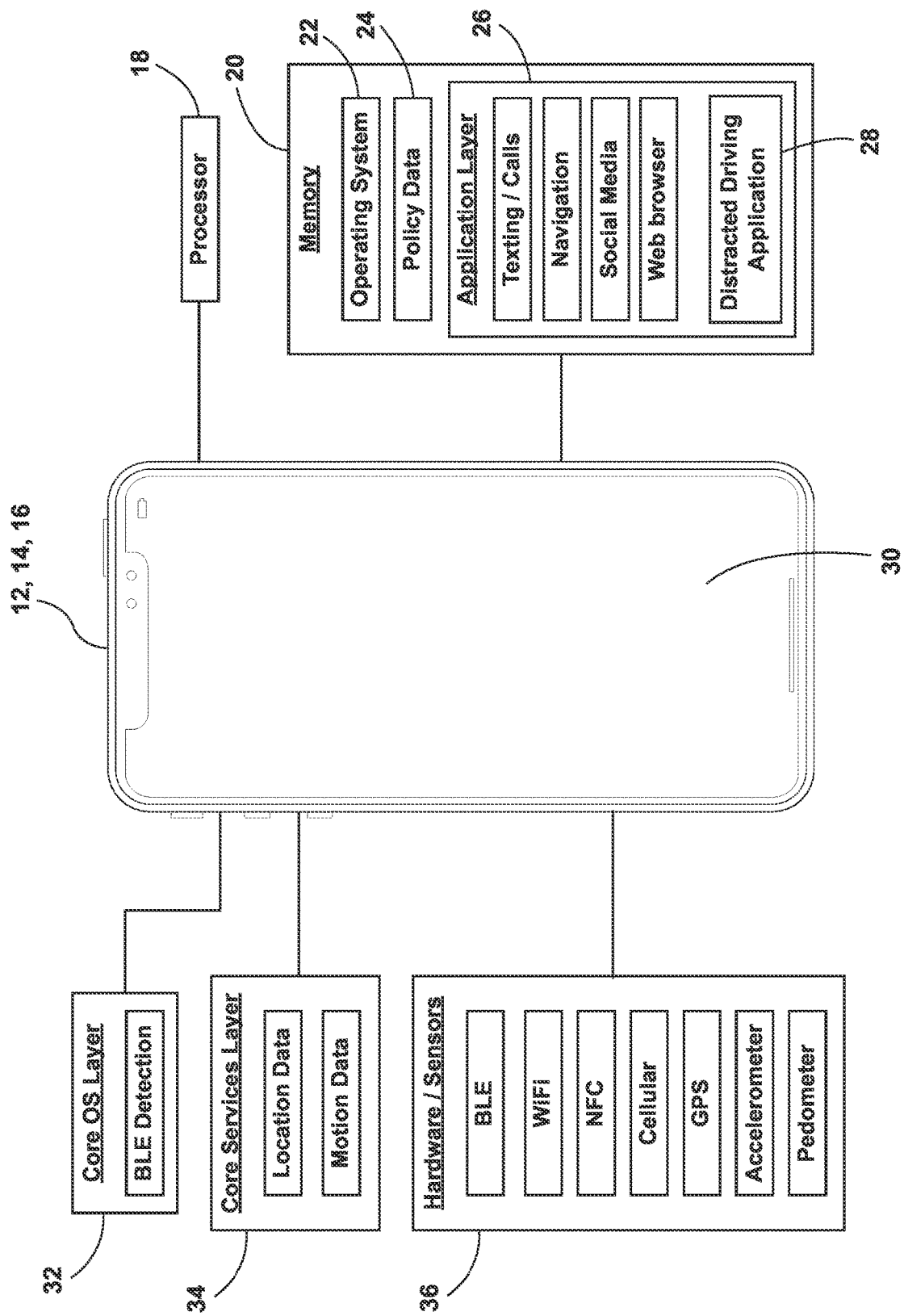
FIG. 3 is an iOS mobile device for use with a method of managing user interactions with multiple mobile device in accordance with one embodiment.
Figure 4:
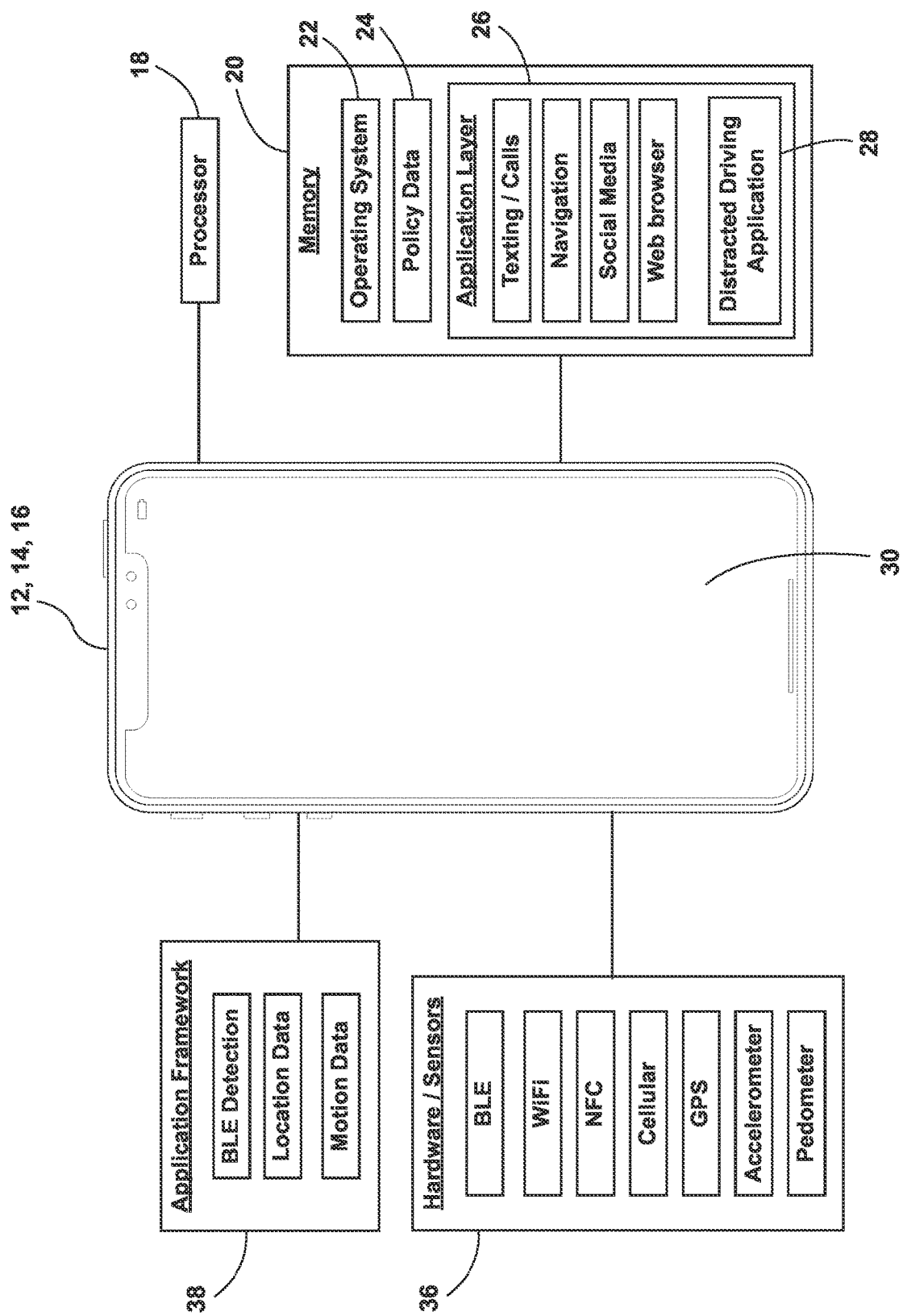
FIG. 4 is an Android mobile device for use with a method of managing user interactions with multiple mobile device in accordance with one embodiment.

Each mobile device 12, 14, 16 is optionally an iOS device or an Android device in network communication with the one or more network beacons 10, 10'. As shown in FIG. 3 (iOS) and FIG. 4 (Android), each mobile device includes a processor 18 and a memory 20, the memory 20 being non-transitory and computer readable, for example a solid-state flash memory. The memory 20 includes the operating system 22, policy data 24, and an application layer 26. The policy data 24 can include N-number of device usage policies for enforcement by the processor 18. The device usage policies overwrite existing policy settings during their enforcement. The device usage policies can be sent to each mobile device from a remote server, optionally over an encrypted SSL/TLS connection, such that third-parties are prevented from spoofing the mobile devices with malicious policy controls. The application layer 26 includes native and non-native applications, including navigation applications, texting applications, social media applications, and internet browsers. Each mobile device also includes a graphical-user-interface (GUI) 30 for interaction with the applications that are resident on the application layer 26.

The application layer 26 also includes a distracted driving application 28, which can receive a user input to associate the mobile device with the on-duty driver or to associate the mobile device with the off-duty driver/passenger. In particular, the distracted driving application 28 is executable by the mobile device processor 18 as the foreground application or as one of several background applications, and can receive a user input, for example a touch input, to designate that device as belonging to the on-duty driver or to designate that device as belonging to the off-duty driver/passenger. The distracted driving application can permit the user to designate the mobile device as the driver device even before movement begins. In this case, all other devices present are automatically set as passenger devices. Alternatively, the devices can be set as passenger devices after driving has commenced via a user input received at the distracted driving application 28. Once all but one device has been set as a passenger device, the final device is assigned to be the driver device and the option to designate such device as a passenger device is removed. Or, optionally, if multiple devices are not set as passenger devices once the drive commences, after a set amount of time any device not set as a passenger device is automatically made into a driver device until the drive is complete.

As also shown in FIG. 3, each iOS device includes a Core OS Layer 32 to support Bluetooth detection and Bluetooth transmission. Using the Core OS Layer 32, the mobile device's beacon (i.e., Bluetooth transmitter) broadcasts a wireless signal over the short range wireless network. The wireless signal is optionally an iBeacon signal having a 128-bit universally unique identifier (UUID) in combination with several bytes (major field and minor field) representing the status of the device as the driver device 12. Each iOS device also includes a Core Services Layer 34. The Core Services Layer 34 derives location and motion data from one or more on-board sensors 36, including GPS sensors, accelerometers, gyroscopes, and/or pedometers, and provides geographic location and motion data to the distracted driving application 28. For Android devices, shown by example in FIG. 4, each mobile device can include an Application Framework 38 to provide Bluetooth detection, motion information, and location information to the distracted driving application 28. For both iOS and Android, the BLE beacon broadcasts one or more data packets including a UUID that is common to all mobile devices running the distracted driving application 28. Using the major field and a portion of the minor field, the data packets contain a unique ID that is specific to a given mobile device, which also allows for counting of the number of mobile devices present. The data packets include a four-bit value contained within the minor field of the wireless BLE signal to indicate the status of the mobile device as a driver mobile device 12, a passenger mobile device 14, 16, or a non-designated mobile device.

Figure 5:
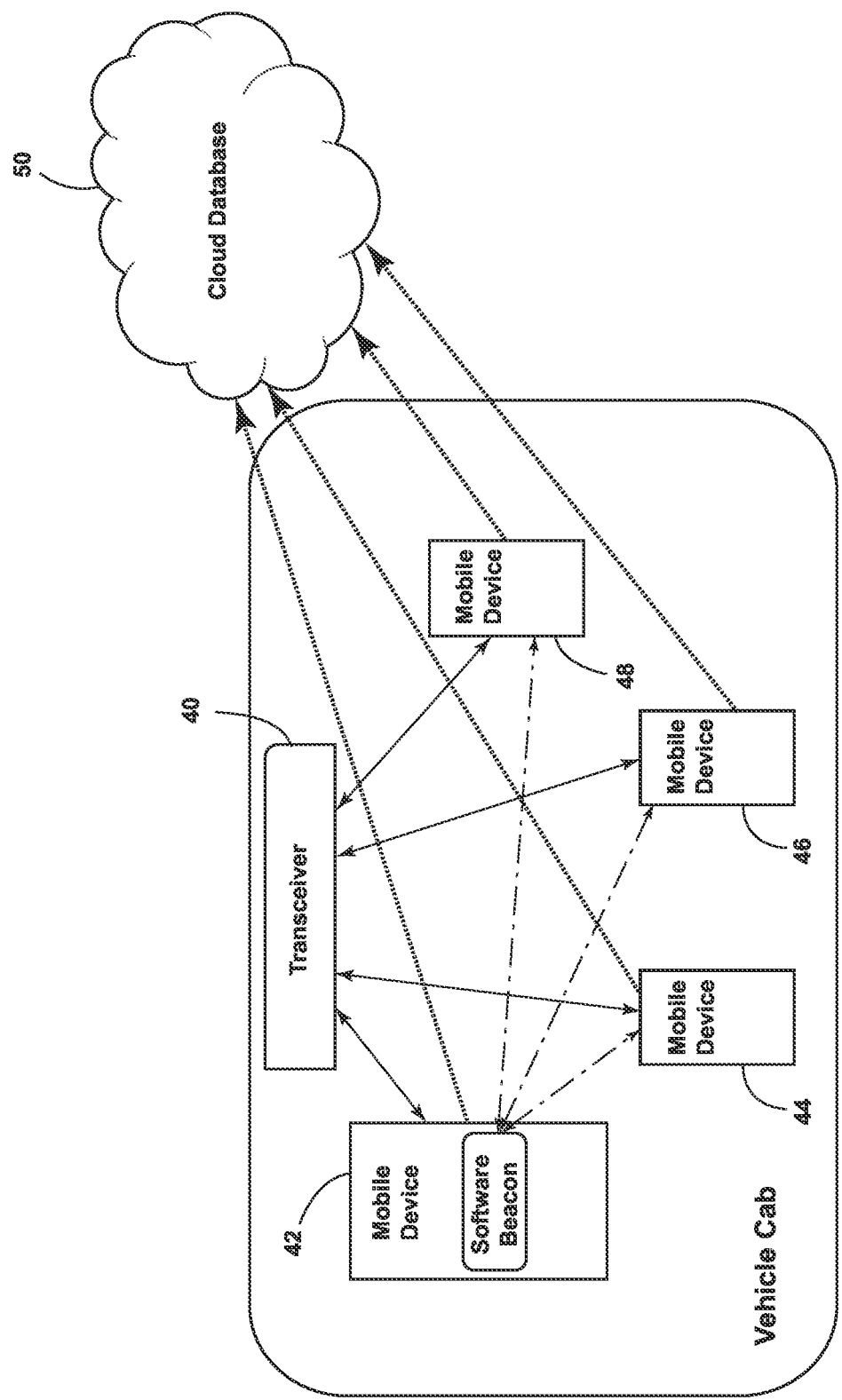
FIG. 5 a system diagram of a short range wireless network including an in-vehicle beacon and multiple mobile devices in accordance with one embodiment.

Referring now to FIG. 5, a wireless network includes an in-vehicle network beacon 40 and multiple mobile devices 42, 44, 46, 48. The mobile devices are connected to the network beacon 40 over a short range wireless network and are connected to a remote server 50 over an internet connection. The remote server 50 (illustrated as a cloud server) includes temporary device usage policies that cause a mobile device to hide non-native applications and non-whitelisted applications from the home screen while a preselected criteria is met, and optionally for a buffer period thereafter. For example, the device usage policy can cause an operating system to hide application tiles for denied applications during the period that the device usage policy is enforced, while simultaneously permitting the denied applications to run in the background application layer. Consequently, a user is prevented from operating the denied applications pursuant to dynamic device usage policies as managed by the remote server 50. When the preselected criteria are no longer met, for example when no motion is detected, the denied application tiles are again visible on the home screen of the affected mobile device.

Figure 6:
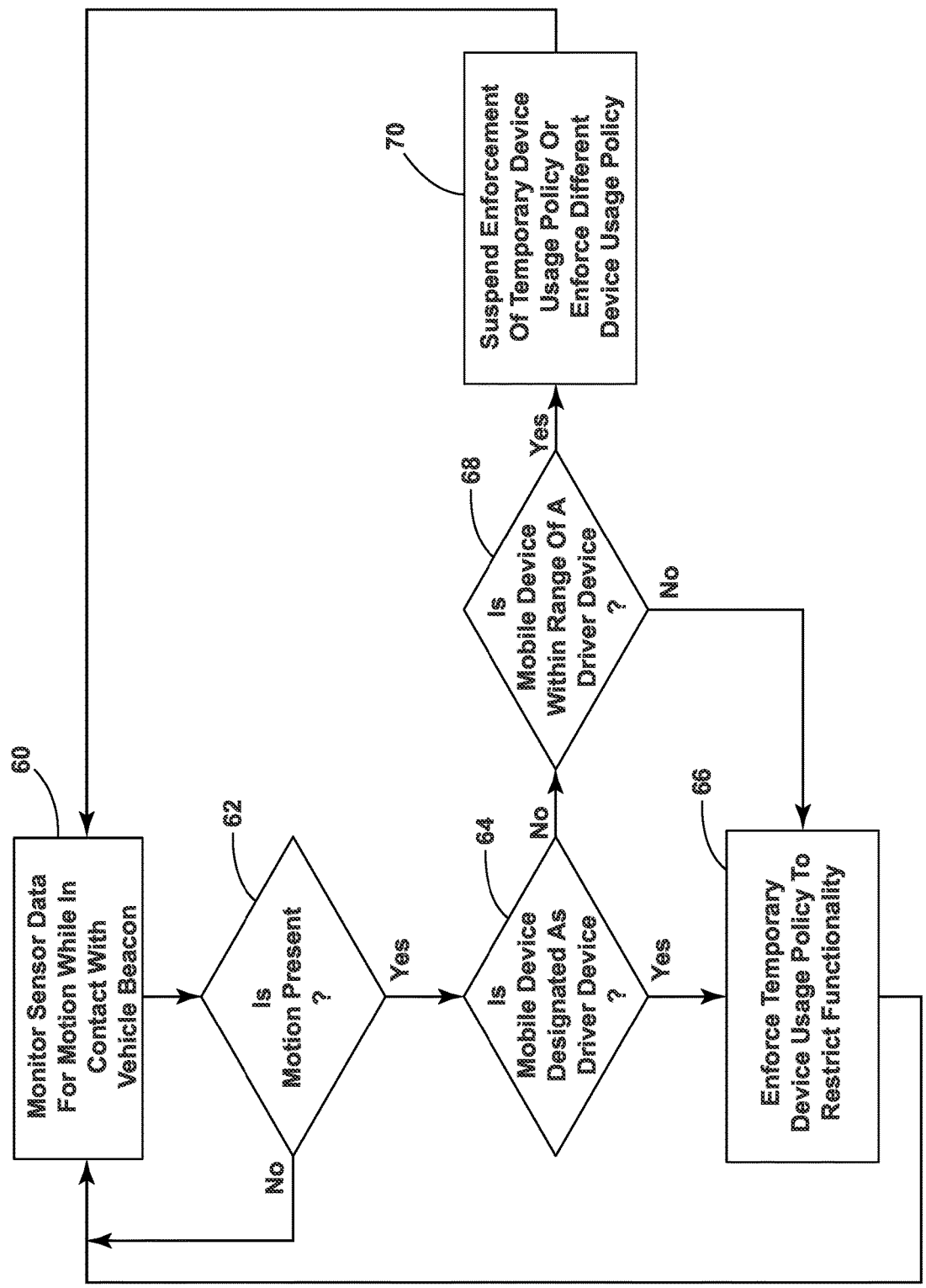
FIG. 6 a flow chart for a method of managing driver interactions with multiple mobile device in accordance with one embodiment of the invention.

Referring now to FIG. 6, a flow chart depicts a method for execution by each of the mobile devices. As a mobile device with an installed application 28 comes into range of the in-vehicle beacon 40, the in-vehicle beacon 40 triggers a push notification on the mobile device or waking up of the application 28 from the background mode. At step 60, the method includes monitoring for motion and/or other criteria. Other criteria can include, by non-limiting example, movement of the mobile device above a threshold speed and/or the geographic location of the mobile device. At decision step 62, the method includes determining whether motion (or other criteria) is present. If motion is not detected, the method reverts to step 60. If motion is detected, the method proceeds to decision step 64. At decision step 64, the method includes determining whether the mobile device is designated as the driver mobile device. This can include receiving a touch input within the distracted driving application 28 to associate the mobile device with the on-duty driver, optionally in response to a user prompt. If the mobile device is designated as the driver device, the method proceeds to step 66 for the enforcement of a temporary device usage policy. The temporary device usage policy restricts mobile device functionality, optionally by hiding application tiles for non-whitelisted applications during the period that the device usage policy is enforced. If the mobile device is not designated as the driver device, or is instead designated as a passenger device, the method proceeds to decision step 68. At decision step 68, if the mobile device has not received the beacon signal of a mobile device designated as a driver device, the method reverts to step 66. However, if the mobile device has received the beacon signal of a mobile device designated as a driver device, the method includes suspending enforcement of the temporary device usage policy at step 70. In this way, users of the passenger mobile devices (e.g., off-duty team drivers) can access functionality that would otherwise be prevented by the device usage policy being enforced on the driver device. When the predetermined criteria are no longer met, the driver regains access to functionality on the driver mobile device. At that point, all devices communicate an idle status to allow for all devices to be used without interruption. The devices monitor for vehicle movement to begin the foregoing process and restrict functionality unless a driver device is designated.

In these and other embodiments, the present invention harnesses the functionality of Bluetooth hardware (or other communication hardware) already present on most mobile devices. The present invention includes a software application that can receive a user designation of the host mobile device as the driver mobile device or passenger device, the smartphone application being further operable to implement a network connection with local devices. Further, the selective enforcement of device usage policies can depend solely on the connection to the driver mobile device and/or an in-vehicle beacon 40, thereby changing policies without a connection to a remote server. For example, if a connection with the remote server 50 is lost, the passenger mobile devices can manage the enforcement of their respective device usage policies based on their continued proximity to the in-vehicle network beacon 40 and the designated driver device 42.

While described herein as relating to team driving scenarios, the present invention is not limited to team driving scenarios and can be used in other environments as desired. Further, while BLE is described above, alternative short range wireless interfaces can be used to facilitate the interface of the mobile devices with each other and the in-vehicle beacon. For example, wireless interfaces can include ZigBee, WiFi, or NFC. The mobile device can include any type of mobile computing device, including a smartphone, laptop, tablet computer, music playing device, wearable computer, or game playing device. The mobile device can optionally include logic to determine the location of the mobile device within the vehicle interior, for example based on measured signal strengths.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for mobile device management, the method comprising:
 providing a plurality of mobile devices, each of the plurality of mobile devices enforcing a first device usage policy if a criteria is detected while within a vehicle;
 receiving, at a first one of the plurality of mobile devices, a touch input associating the first one of the plurality of mobile devices with a driver of the vehicle, such that all remaining ones of the plurality of mobile devices are associated with one or more passengers within the vehicle as passenger mobile devices;

transmitting, by the first one of the plurality of mobile devices, one or more signals to each of the passenger mobile devices over a short range wireless network, the one or more signals including a unique identifier and indicating the association of the first one of the plurality of mobile device with the driver of the vehicle; and in response to receiving the one or more signals from the first one of the plurality of mobile devices, providing the passenger mobile devices with access to one or more features that are restricted under the first device usage policy.

2. The method of claim 1, wherein the short range wireless network includes Bluetooth, ZigBee, WiFi, or Near Field Communication.

3. The method of claim 1, further including receiving, at each of the plurality of mobile devices, the first device usage policy from a remote server.

4. The method of claim 1, further including receiving, at each of the plurality of mobile devices, a Bluetooth signal from an in-vehicle network beacon.

5. The method claim 1, wherein the unique identifier is encoded in a Bluetooth signal or includes a Media Access Control address or an International Mobile Subscription Identity.

6. The method of claim 1, wherein the criteria includes movement of the plurality of mobile devices above a threshold speed, motion of the plurality of mobile devices, or a geographic location of the plurality of mobile devices.

7. A system for mobile device management, the system comprising:

a mobile device including memory coupled to at least one processor of the mobile device and configured to provide the at least one processor with instructions; and the at least one processor configured to:
associate the mobile device with a driver of a vehicle based on a touch input at the mobile device,
enforce a device usage policy to selectively limit access to denied mobile device functionality if a criteria is met while the mobile device is within the vehicle,
in response to the mobile device being associated with the driver of the vehicle, enforce the device usage policy when the criteria is met and cause the mobile device to transmit one or more signals including a unique identifier to at least one other mobile device within the vehicle,
in response to the mobile device being connected to a further mobile device that is associated with the driver of the vehicle, permit access to the denied mobile device functionality at the mobile device.

8. The system of claim 7, wherein the short range wireless network includes Bluetooth and wherein the unique identifier is encoded in a major field and a minor field of a Bluetooth signal.

9. The system of claim 7, wherein the criteria includes movement of the mobile device above a threshold speed, motion of the mobile device, or a geographic location of the mobile device.

10. A method for mobile device management at a driver mobile device comprising:

receiving, at the driver mobile device, one or more signals from an in-vehicle network beacon over a short range wireless network;

receiving, at the driver mobile device, a touch input associating the driver mobile device with a vehicle driver;

causing the driver mobile device to transmit one or more signals to a passenger mobile device over the short range wireless network, wherein both of the passenger mobile device and the driver mobile device are located within a vehicle, the one or more signals including a unique identifier and indicating the association of the driver mobile device with the vehicle driver; and restricting user access to one or more features of the driver mobile device in response to detected motion of the driver mobile device.

11. The method of claim 10, wherein the short range wireless network includes Bluetooth, ZigBee, WiFi, or Near Field Communication.

12. The method of claim 10, further including receiving, at the driver mobile device, a temporary device usage policy from a remote server to restrict user access to one or more features of the driver mobile device while the driver mobile device is in motion.

13. The method of claim 10, further including notifying a remote server that the driver mobile device is within range of the in-vehicle network beacon.

14. The method of claim 10, wherein the unique identifier is encoded in a Bluetooth signal or includes a Media Access Control address or an International Mobile Subscription Identity.

15. A method for mobile device management at a passenger mobile device comprising:

restricting access to one or more features of the passenger mobile device pursuant to a temporary device usage policy;

receiving, at the passenger mobile device, one or more signals from a driver mobile device over a short range wireless network in response to a touch input at the driver mobile device to designate the driver mobile device as being associated with a driver of a vehicle, wherein both of the passenger mobile device and the driver mobile device are located within the vehicle, the one or more signals including a unique identifier associated with the driver mobile device; and in response to receiving the one or more signals from the driver mobile device, limiting enforcement of the temporary device usage policy at the passenger mobile device to provide a user of the passenger mobile device access to the one or more features that are restricted at the driver mobile device under the temporary device usage policy.

16. The method of claim 15, wherein the short range wireless network includes Bluetooth, ZigBee, WiFi, or Near Field Communication.

17. The method of claim 15, wherein the unique identifier is encoded in a Bluetooth signal or includes a Media Access Control address or an International Mobile Subscription Identity.

18. The method of claim 15, further including receiving a beacon signal from an in-vehicle network beacon over the short range wireless network.

19. The method of claim 15, further including receiving the temporary device usage policy from a remote server.

\* \* \* \* \*